(12) United States Patent
Delaney et al.

(10) Patent No.: US 10,960,568 B2
(45) Date of Patent: Mar. 30, 2021

(54) POWER TOOL ATTACHMENT SAW

(71) Applicant: D2 Management, LLC, East Norriton, PA (US)

(72) Inventors: Keith J. Delaney, East Norriton, PA (US); Paul Falcone, Norristown, PA (US)

(73) Assignee: D2 Management, LLC, East Norriton, PA (US)

( * ) Notice: Subject to any disclaimer, the term of this patent is extended or adjusted under 35 U.S.C. 154(b) by 0 days.

(21) Appl. No.: 15/656,329

(22) Filed: Jul. 21, 2017

(65) Prior Publication Data
US 2019/0022889 A1 Jan. 24, 2019

(51) Int. Cl.
*B27B 19/00* (2006.01)
*B23D 49/11* (2006.01)
*B23D 49/00* (2006.01)
*B23D 61/00* (2006.01)

(52) U.S. Cl.
CPC .......... *B27B 19/008* (2013.01); *B23D 49/003* (2013.01); *B23D 49/11* (2013.01); *B23D 61/006* (2013.01)

(58) Field of Classification Search
CPC .... G01B 3/1056; B23D 49/11; B23D 49/003; B23D 61/00; B23D 61/006; B23B 51/0453; B27B 19/008
USPC ........ 33/758, DIG. 10; 83/614, 618; 30/360, 30/500
See application file for complete search history.

(56) References Cited

U.S. PATENT DOCUMENTS

| | | | | |
|---|---|---|---|---|
| 1,100,325 A | * | 6/1914 | Pronovost | G01B 3/1056 33/758 |
| 1,408,347 A | * | 2/1922 | Currie | G01B 3/1071 33/758 |
| 3,381,376 A | * | 5/1968 | Ames | B26D 1/445 30/358 |
| 3,503,294 A | * | 3/1970 | Henigan | B23D 49/00 125/18 |
| 4,848,309 A | * | 7/1989 | Alderete | B25D 3/00 125/40 |

(Continued)

FOREIGN PATENT DOCUMENTS

| AU | 2014227526 A1 | 4/2015 |
|---|---|---|
| CN | 204248104 U | 4/2015 |
| DE | 202011052062 U1 | 4/2012 |

OTHER PUBLICATIONS

QBit SQ1000-S Power Oscillating Multi-Tool Saw Blade/Box Saw for Single Gang Outlet Box, downloaded from Amazon.com, dated Oct. 23, 2017, 3 pages.

(Continued)

*Primary Examiner* — Laura M Lee
(74) *Attorney, Agent, or Firm* — Barley Snyder

(57) ABSTRACT

A power tool attachment saw according to the invention is provide and includes a body plate, a connector section and a plurality of cutting walls. The body plate is a planar body and the connector section positioned on one side of the planar body and adapted for attachment to an oscillating power tool. The plurality of cutting walls are positioned orthogonal to and extend from exterior edges of the planar body to form a material receiving space. The plurality of cutting walls provide a uniform cutting edge about the material receiving space.

12 Claims, 13 Drawing Sheets

(56) References Cited

U.S. PATENT DOCUMENTS

| | | | | |
|---|---|---|---|---|
| 5,048,190 | A * | 9/1991 | Aurness | B23D 49/006 30/299 |
| 5,079,848 | A * | 1/1992 | Oshiro | B44D 3/38 33/392 |
| 5,797,189 | A * | 8/1998 | Gilbert | B23D 49/003 144/363 |
| 5,860,218 | A * | 1/1999 | Vinciguerra | B23D 49/003 30/392 |
| 5,867,913 | A * | 2/1999 | Pettigrew | B23D 49/003 144/363 |
| 5,946,809 | A * | 9/1999 | Bright | B26F 1/32 30/305 |
| 6,370,790 | B1 * | 4/2002 | Stenger | G01B 3/1056 33/758 |
| 6,565,294 | B1 * | 5/2003 | Young | B23B 41/04 144/73 |
| 9,027,452 | B2 | 5/2015 | Nagy et al. | |
| 9,186,770 | B2 * | 11/2015 | Montplaisir | B24B 23/04 |
| 9,358,623 | B2 * | 6/2016 | Burks | B23D 49/11 |
| 9,737,941 | B2 * | 8/2017 | Turner | B23D 49/11 |
| 9,764,400 | B2 * | 9/2017 | Sebhatu | B23D 49/003 |
| 10,081,067 | B2 * | 9/2018 | Caroprese | B23D 49/11 |
| 2006/0018730 | A1 * | 1/2006 | Ernst | F16B 13/002 411/31 |
| 2009/0312761 | A1 * | 12/2009 | Boykin | B27B 19/006 606/82 |
| 2011/0027030 | A1 * | 2/2011 | Capstran | B23B 51/0453 408/144 |
| 2012/0125171 | A1 * | 5/2012 | Chen | B23B 51/0473 83/610 |
| 2014/0224091 | A1 * | 8/2014 | Sebhatu | B23D 49/003 83/620 |
| 2014/0338513 | A1 * | 11/2014 | Burks | B23D 49/003 83/745 |
| 2015/0165633 | A1 | 6/2015 | Padget | |
| 2016/0082605 | A1 | 3/2016 | Marks | |
| 2017/0001252 | A1 * | 1/2017 | Caroprese | B23D 49/11 |
| 2017/0157687 | A1 * | 6/2017 | Turner | B23D 49/11 |
| 2017/0157688 | A1 * | 6/2017 | Turner | B23D 49/11 |
| 2017/0297217 | A1 * | 10/2017 | Bourne | B23D 51/10 |

OTHER PUBLICATIONS

Notification of Transmittal, and the International Search Report and the Written Opinion of the International Searching Authority, or the Declaration, dated Oct. 23, 2018, 13 pages.
Abstract of CN 204248104U, dated Apr. 8, 2015, 1 page.

* cited by examiner

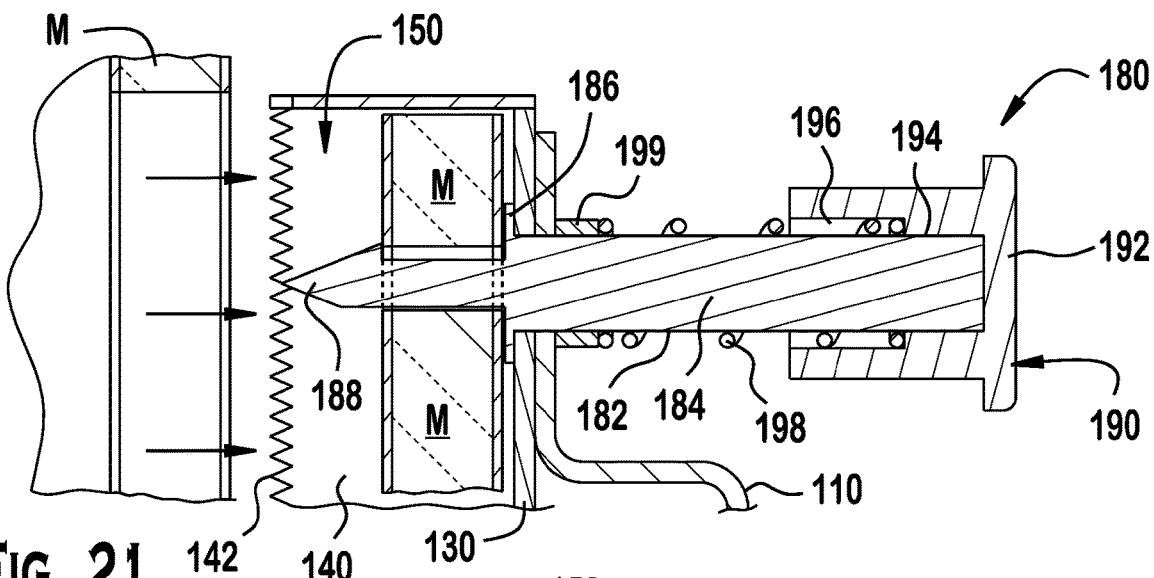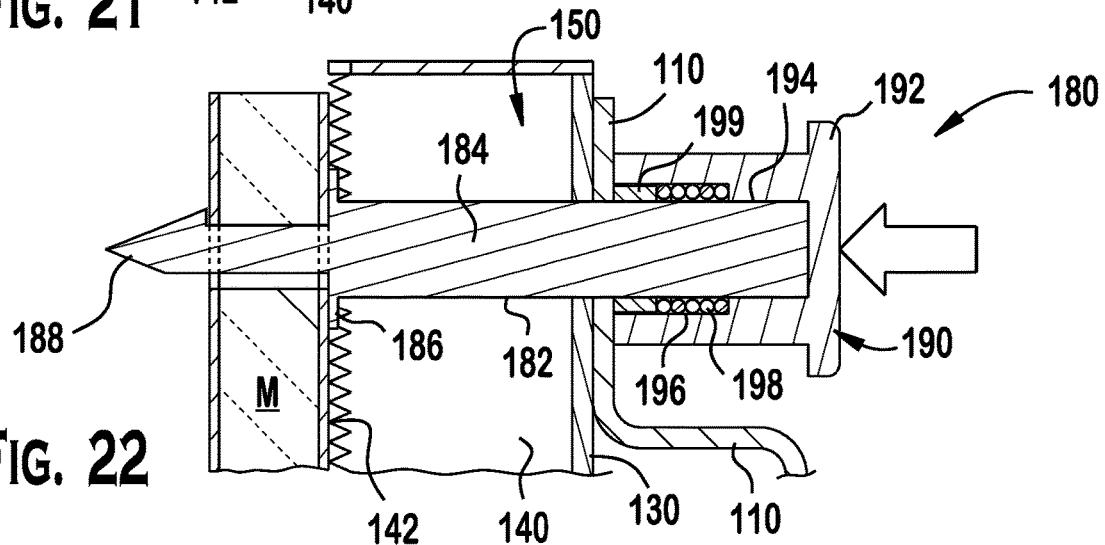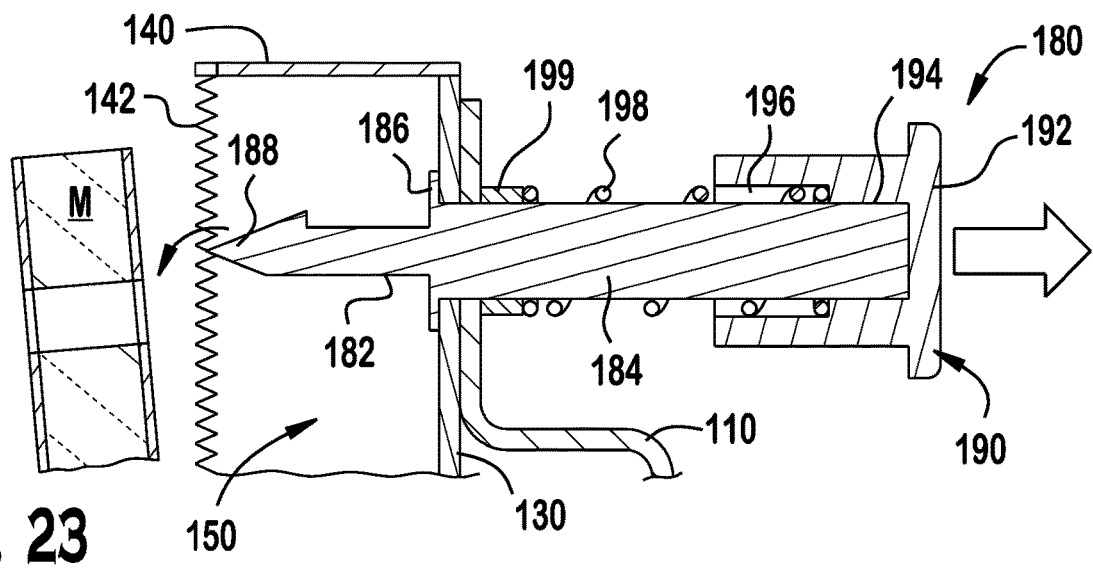

US 10,960,568 B2

POWER TOOL ATTACHMENT SAW

FIELD OF THE INVENTION

The present invention relates to a power tool attachment and, more particularly, to an oscillating power tool attachment saw for cutting drywall.

BACKGROUND

Modern buildings including homes, offices and other structures often use drywall to cover interior walls and ceilings. During installation, an installer will cut standard sheets of drywall to fit the building interior, and then make more specific cuts for outlet boxes for electrical outlets and light switches. To perform these cuts, the installer will commonly use a knife, a box cutter or other known cutting implement to partially cut through one side of the drywall. The installer then is required to break, fold over and then finish cutting the craft paper on the opposite side. This known process is tedious and causes gypsum to be scattered about the prep and work area.

More recently, installers have turned to power tools, such as oscillating power tools, to make these common cuts. Known oscillating power tools, for instance, provide vibratory motion for an attachment to cut through the drywall with ease. However, many known attachments for these oscillating power tools still require a large number of independent actions to perform accurate cuts. For example, the installer still needs to take several measurements to accurately match the dimensions of the opening for a desired position along the drywall. Furthermore, since several cuts are performed, the oscillating power tool causes gypsum and cut pieces to be scattered about the prep and work area, which causes more time for clean up. Therefore, there is a need for an improved tool attachment to cut openings in drywall that is more convenient, efficient, and easy to use.

SUMMARY

A power tool attachment saw according to the invention is provide and includes a body plate, a connector section and a plurality of cutting walls. The body plate is a planar body and the connector section positioned on one side of the planar body and adapted for attachment to an oscillating power tool. The plurality of cutting walls are positioned orthogonal to and extend from exterior edges of the planar body to form a material receiving space. The plurality of cutting walls providing a uniform cutting edge about the material receiving space.

BRIEF DESCRIPTION OF THE DRAWINGS

In the drawings, the same reference numerals are always used for elements with the same function and/or the same structure.

FIG. 21 is a sectional view of the power tool attachment saw of FIG. 9, showing use with a known oscillating power tool to provide an opening in known material;

FIG. 22 is a sectional view of the power tool attachment saw of FIG. 9, showing ejection of the known material held by the catch; and FIG. 23 is a sectional view of the power tool attachment saw of FIG. 9, showing further ejection of material held by the catch.

DETAILED DESCRIPTION OF THE EMBODIMENT(S)

Embodiments of the invention will now be described in greater detail with reference to the drawings.

Figure 1:
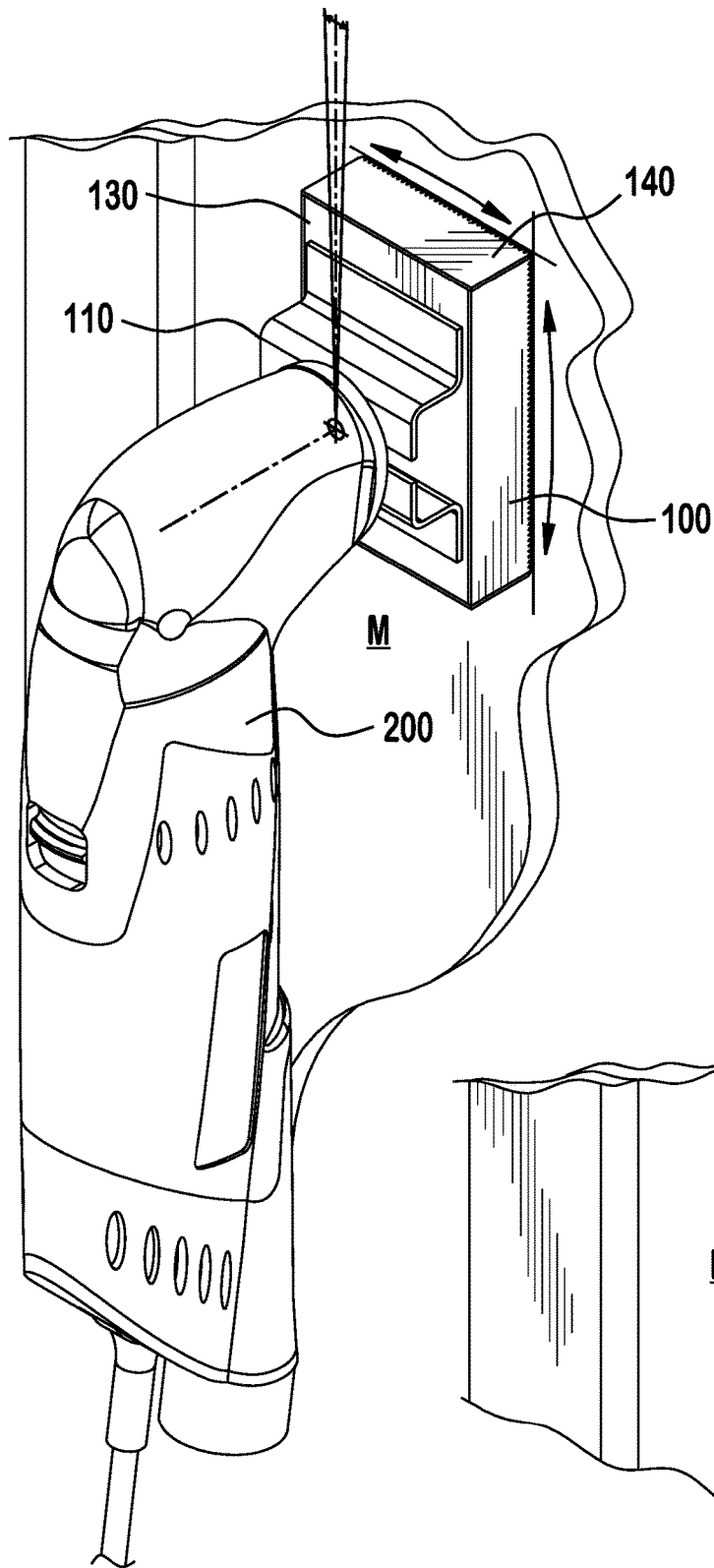
FIG. 1 is a perspective view of a known oscillating power tool connected to a power tool attachment saw according to the invention.
Figure 2:
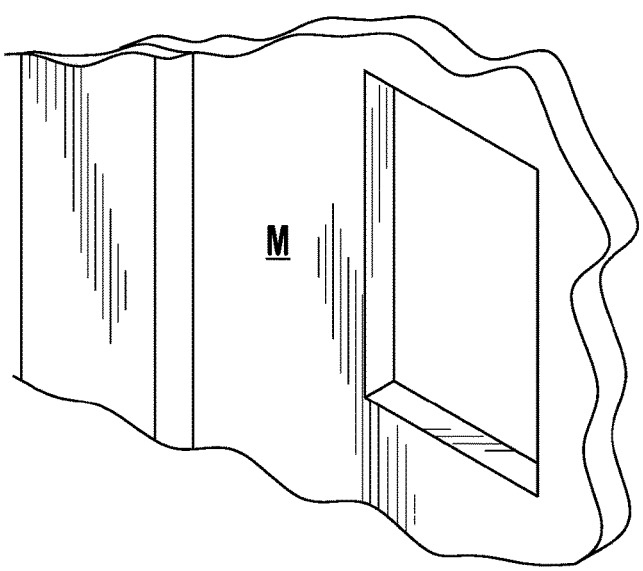
FIG. 2 is a perspective view of an opening provided by a power tool attachment saw of FIG. 1.
Figure 3:
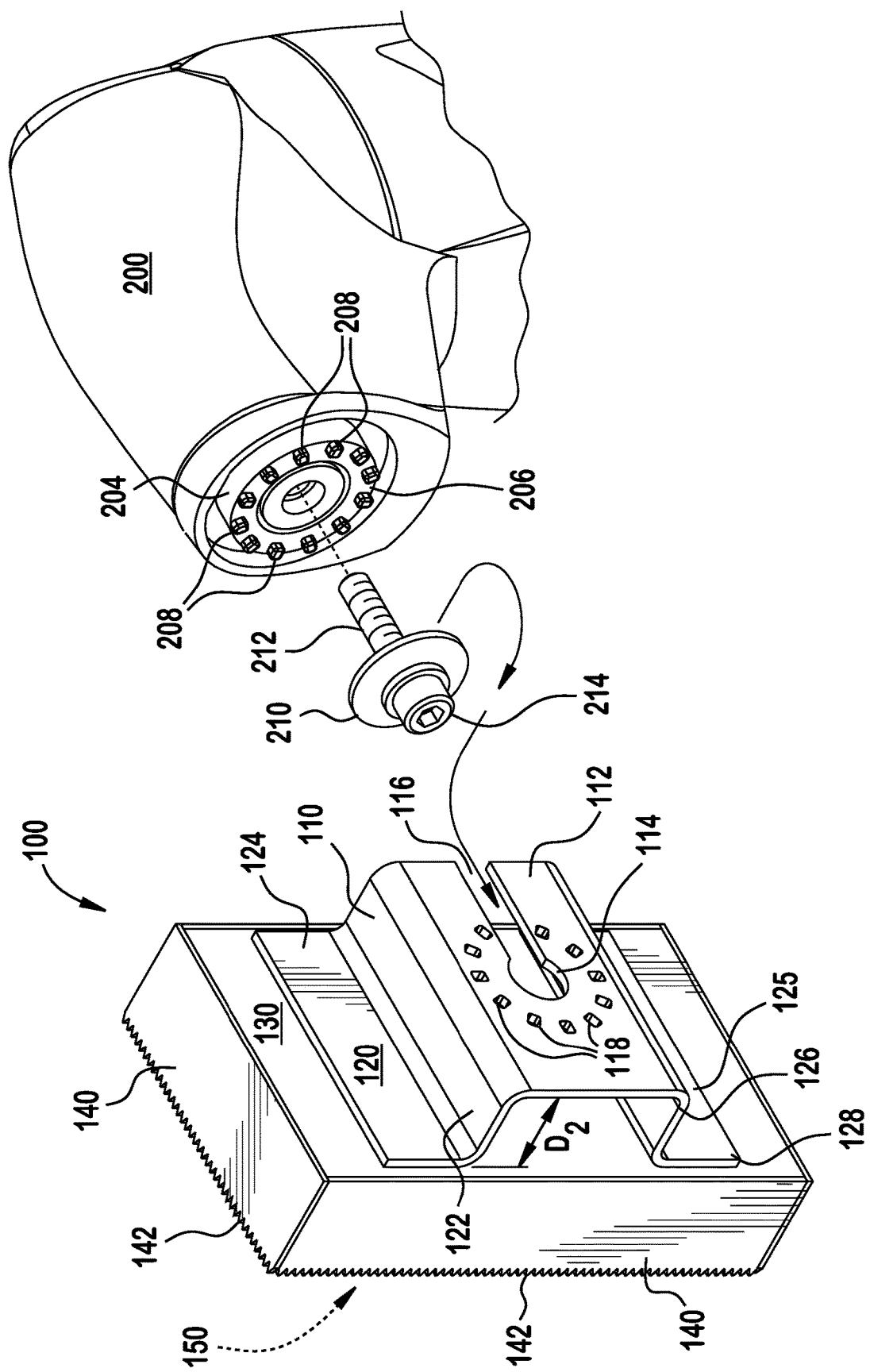
FIG. 3 is an exploded perspective view of the power tool attachment saw from FIG. 1, showing assembly with a known oscillating power tool.

As shown in FIGS. 1-3, an improved power tool attachment saw 100 according to the invention is provided and is for use with a known oscillating portable or handheld power tool 200.

In general, the power tool attachment saw 100 is made from steel or another hard material typically used for power tool attachments, such as blades or rasps, depending on the surface being cut, and is coupled to the power tool 200.

As shown in FIG. 3, the power tool 200 generally includes a motor (not shown), a spindle 204 and an attachment fastener 210. The spindle 204 is attached to the motor (not shown) which allows spindle 204 to rapidly rotate back and forth by a narrow angle of oscillation.

In the shown embodiment, the spindle 204 generally includes an interface 206 with a plurality of protrusions 208 disposed about the interface 208. In the shown embodiment, the interface surface 206 is a planar surface end of the spindle 204. The spindle 204 further includes a fastener-receiving passageway 208. As shown, the fastener-receiving passageway 208 is a threaded passageway that is shaped and sized to correspond with the attachment fastener 210.

In the shown embodiment, the attachment fastener 210 generally includes a fastener shaft 212 and a fastener head 214. The fastener shaft 212 is a threaded fastener with an external male thread that is sized and shaped to correspond with the fastener-receiving passageway 208, and is detachable from spindle 204.

Generally, the spindle 204 and the attachment fastener 210 are adapted to attach with a number of different tools or tool accessories, one of which is a power tool attachment saw 100 according to the invention.

As shown in FIG. 3, a power tool attachment saw 100 according to the invention generally includes the following major components: a connector section 110, a body plate 130, and a plurality of cutting walls 140. The connector plate 110 is secured to the body plate 130, and the cutting walls 140 extend outward from the body plate 130 to provide a cutting tool form that provides repeatable, accurate cuts of uniform dimensions.

As shown in FIG. 3, the connector section 110 includes a connector plate 112, a first support arm 120 extending from one end of the connector plate 112, and a second support arm 125 extending from an opposite end of the connector plate 112.

Figure 15:
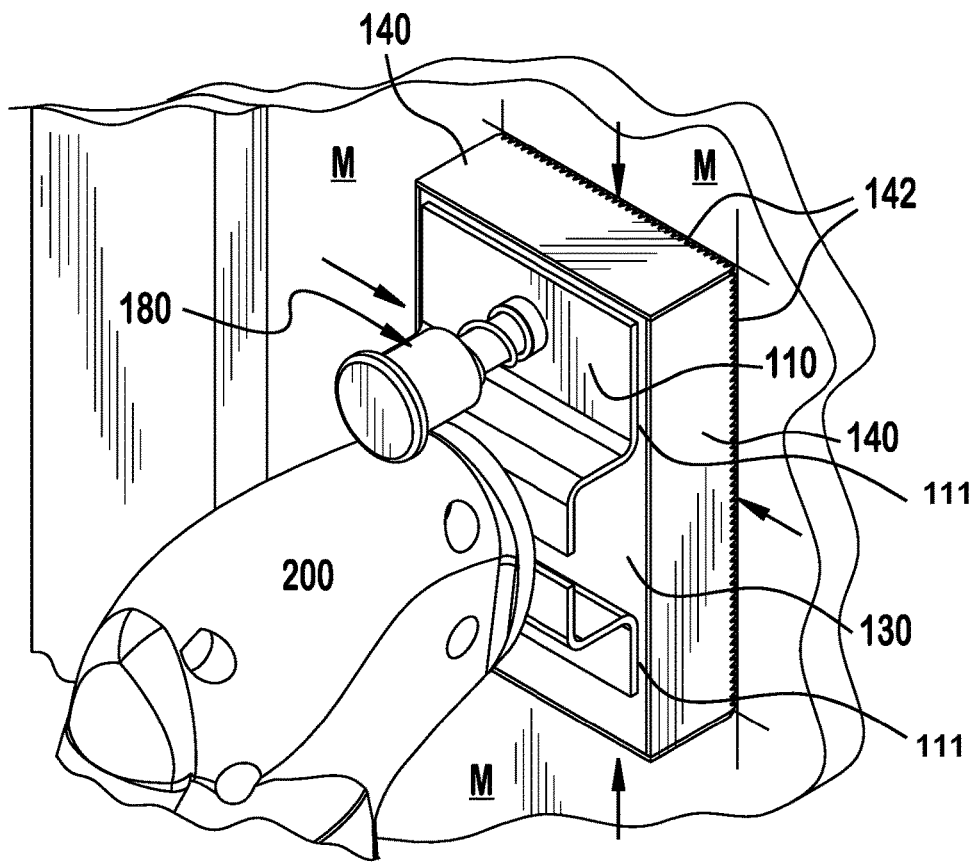
FIG. 15 is a perspective view of another power tool attachment saw with a catch according to the invention.
Figure 16:
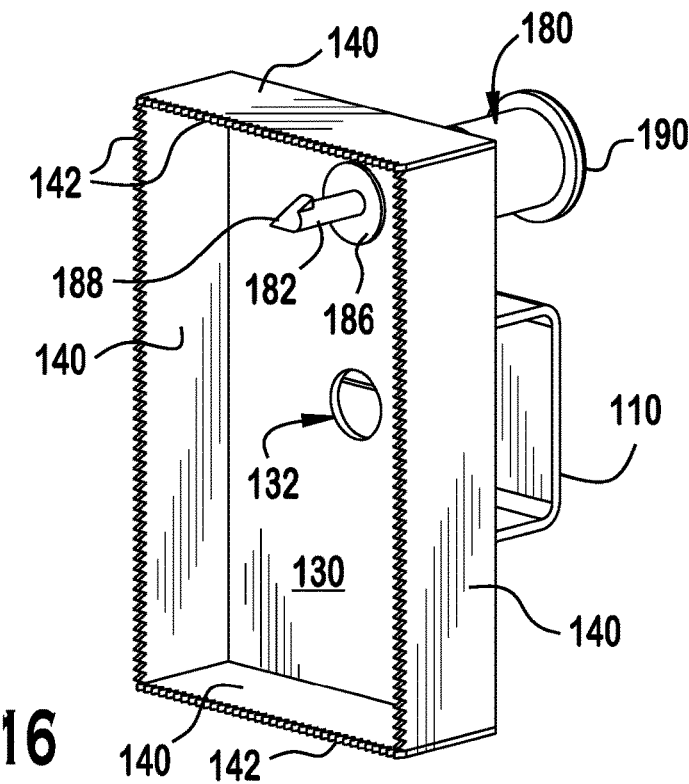
FIG. 16 is a rear view of the power tool attachment saw of FIG. 15.
Figure 17:
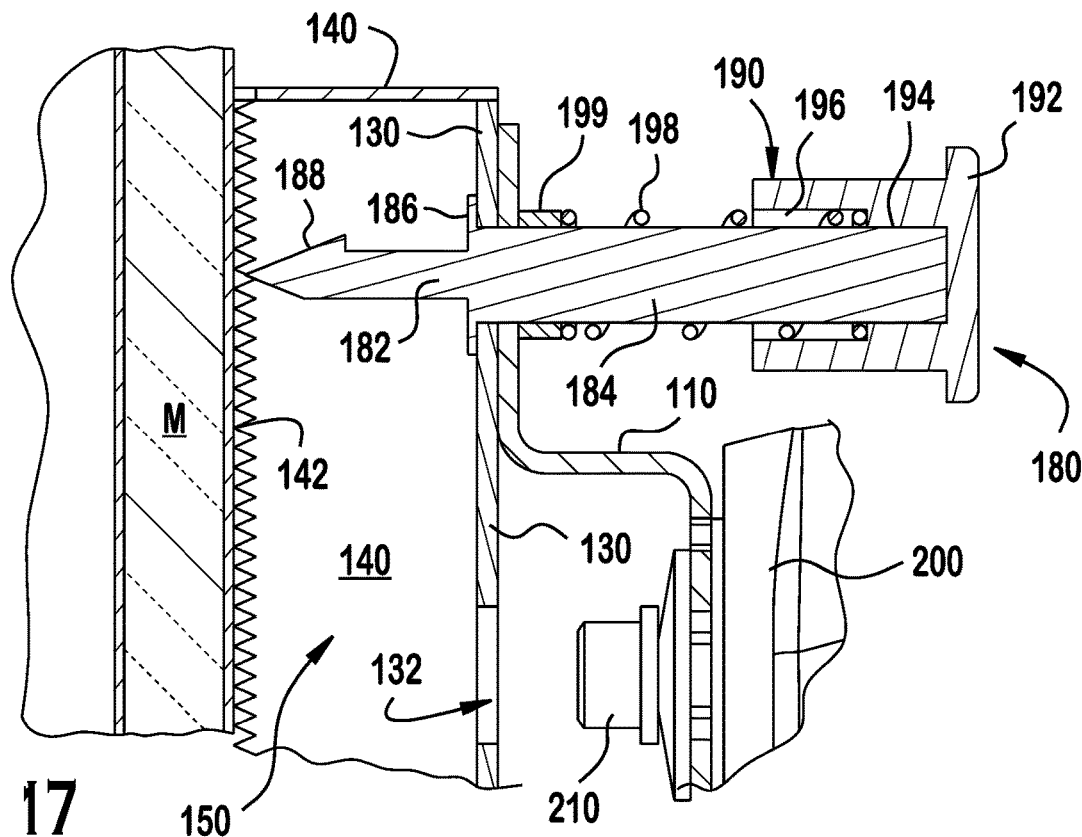
FIG. 17 is a sectional view of the power tool attachment saw of FIG. 15, showing use with a known oscillating power tool.

In an exemplary embodiment, the connector section 110 is made from a single sheet of material, for instance, metal. In the shown embodiment, the connector plate 112, the first support arm 120, and the second support arm 125 are formed by bending the sheet of material into a defined configuration, such as the exemplary embodiment described below. While the connector section 110, in the shown embodiment, is integrally formed by bending a sheet of material, the connector section 110 could also be molded or, in the alternative, the connector section 110 may be formed from individual manufactured pieces that are then secured together using any known joining techniques, such as welding, fastening, or any other method that provides a secure, non-movable connection between the pieces, including adhesion. In an embodiment, as depicted in FIG. 15, the connector section 110 is made of a pair of discontinuous connection sections 111.

In the shown embodiment, the connector plate 112 is a planar body that generally includes a fastener-receiving passageway 114, a fastener-positioning channel 116, and a plurality of protrusion receiving spaces 118. In an exemplary embodiment, the fastener-receiving passageway 114 is a circular void extending there through and is positioned proximate to a center of the planar body. The fastener-positioning channel 116 is also a void, but is an elongated void extending through the planar body from one side of the connector plate 112 to the fastener-receiving passageway 114. The plurality of protrusion receiving spaces 118 are provided and arranged evenly about the fastener-receiving passageway 114. The fastener-receiving passageway 114 and the protrusion receiving spaces 118 are sized, shaped, and positioned complementary to the fastener shaft 212 and the protrusions 208 of the spindle 204.

The first support arm 120 is a planar body and generally includes a first extension section 122 and a first connector section 124. In the shown embodiment, the first extension section 122 and the first connector section 124 are planar bodies that are orthogonally positioned to each other. In an exemplary embodiment, the first extension section 122 extends away from the connector plate 112 and, more particularly, at a 90° degree angle. However, one skilled in the art should appreciate that that the angle at which the first support arm 120 extends could be selected based on structural preference of the connector plate 112.

The second support arm 125 is also a planar body and generally includes a second extension section 126 and a second connector section 128. In the shown embodiment, the second extension section 122 and the second connector section 128 are planar bodies that are orthogonally positioned with respect to each other. In an exemplary embodiment, the second extension section 122 extends away from the connector plate 112 and, more particularly, at a 90° degree angle. However, one skilled in the art should appreciate that that the angle at which the second support arm 120 extends could be selected based on structural preference of the connector plate 112.

One skilled in the art should appreciate that in an alternative embodiment, the first support arm 120 and the second support arm 125 can extend from the connector plate 112 at different angles, including those less than or greater than a 90° degree angle.

Figure 4:
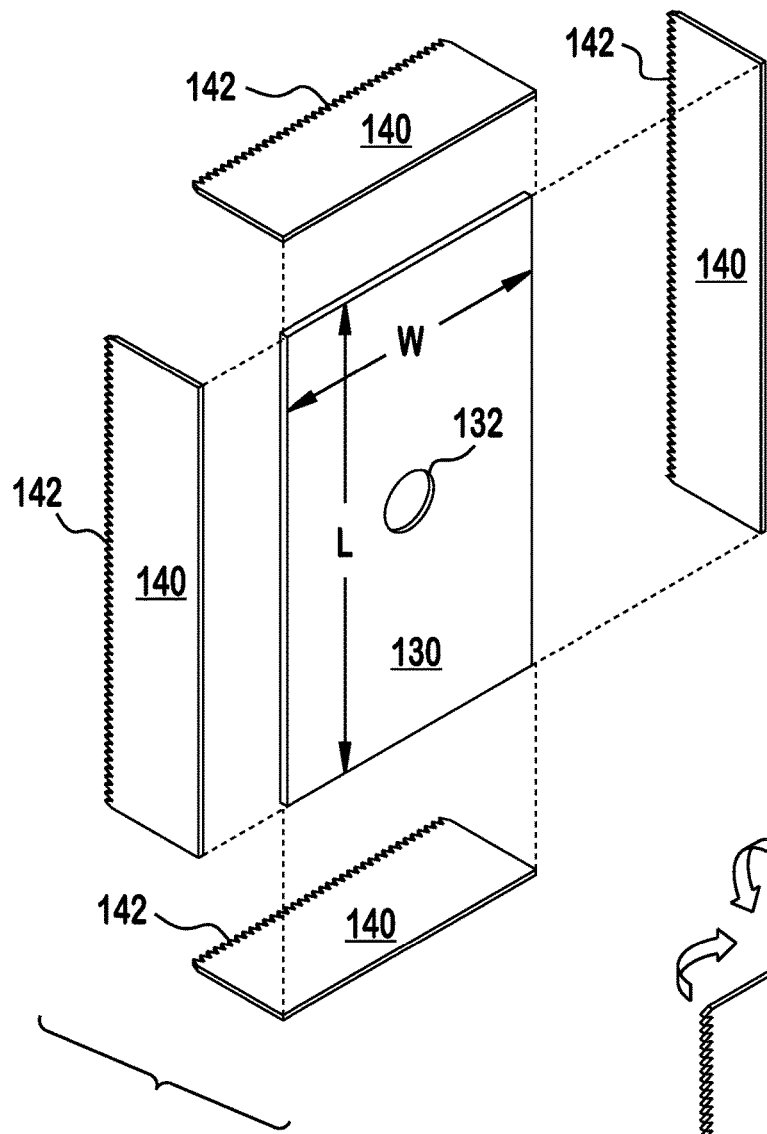
FIG. 4 is an exploded perspective view of a power tool attachment saw according to the invention, showing a body plate and a plurality of cutting walls thereof.
Figure 5:
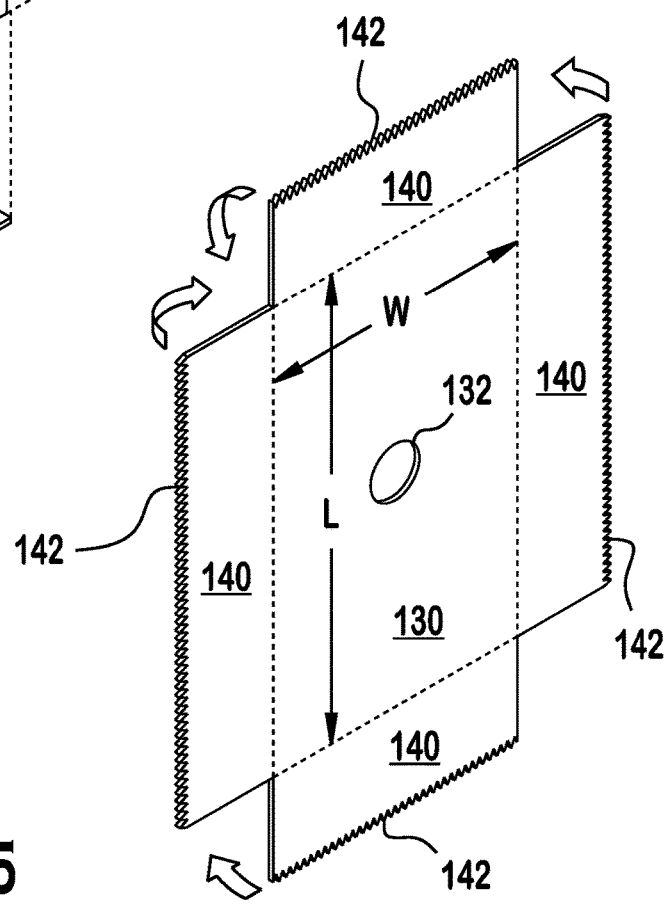
FIG. 5 is an exploded perspective view of another power tool attachment saw according to the invention, showing a body plate and a plurality of cutting walls thereof.

With reference to FIGS. 3-5, the body plate 130 and the cutting walls 140 will be described.

As shown, the body plate 130 is a planar body having a length L and a width W. The body plate 130 generally includes a tool receiving passageway 132 extending there through. In the embodiment shown, the tool receiving passageway 132 is positioned proximate to a substantial center of the body plate 130. The cutting walls 140 are also planar bodies matching the length L or width W of the body plate 130. The cutting walls 140 extend from edges of the body plate 130 by a depth D1 that is larger than a thickness T of material to be cut (i.e. drywall), with each cutting wall 140 having a cutting edge 142. In the shown embodiment, the body plate 130 is rectangular and includes four cutting walls 140 extending orthogonally therefrom. The cutting walls 140 are positioned and secured to outer edges of the body plate 130 at 90° degree angles. The cutting walls 140 may be secured using any known joining techniques, such as welding, fastening, or any other method that provides a secure, non-movable connection between the pieces, including adhesion. As assembled, the body plate 130 and the cutting walls 140 provide a defined form as a rectangular box with a material receiving space 150.

As shown, the body plate 130 and the cutting walls 140 may be formed from a single sheet of material (FIG. 5) or from individual pieces of material (FIG. 4). If made from a moldable material, the body plate 130 and the cutting walls 140 may be integrally formed without any subsequent assembly.

In the shown embodiment, the cutting edge 142 is a serrated shaped edge and, more particularly, a hard toothed edge. However, one skilled in the art should appreciate that other known cutting surfaces could be used, such as a blade or burred edge.

As shown in FIG. 3, the connector section 110 is positioned on the body plate 130, such that the tool receiving passageway 132 and the fastener-receiving passageway 114 correspond with each other. The first support arm 120 and the second support arm 125 are then secured to the body plate 130 using any known joining techniques, such as welding, fastening, or any other method that provides a secure, non-movable connection between the pieces, including adhesion. The connector plate 112 is positioned above the body plate 130 by a depth D2 that is larger than a height H of the fastener head 214

Figure 9:
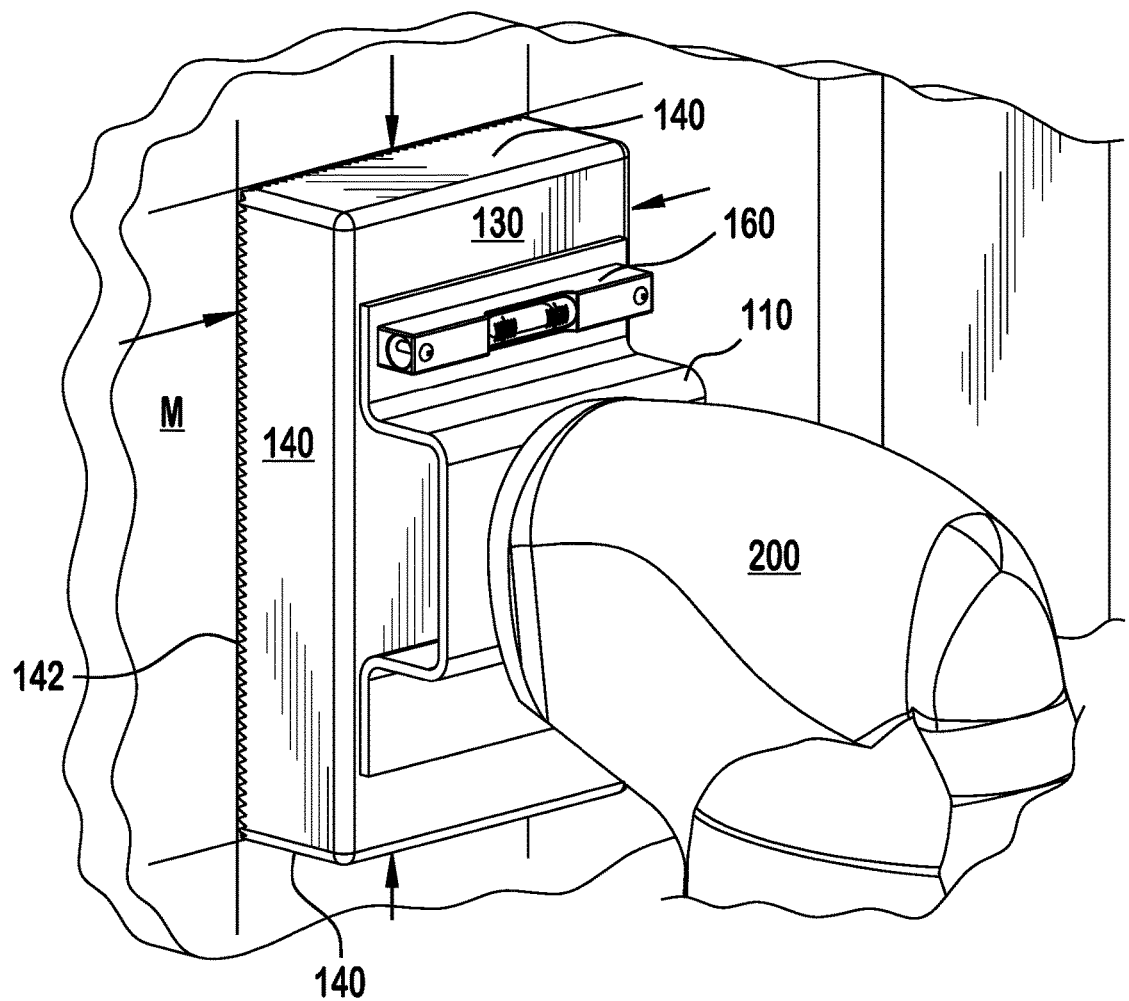
FIG. 9 is a perspective view of another power tool attachment saw according to the invention, showing a level.
Figure 10:
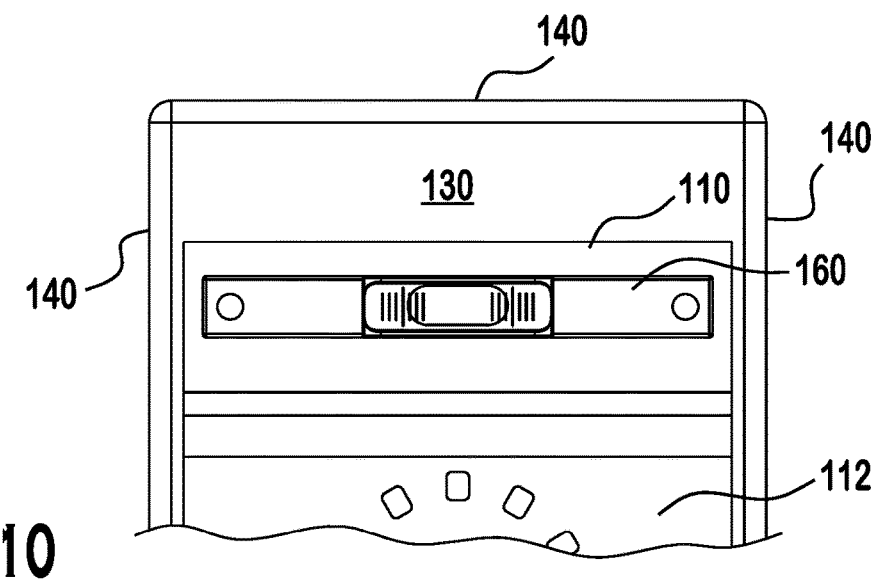
FIG. 10 is a front view of the power tool attachment saw of FIG. 9.

In an exemplary embodiment of the invention, the power tool attachment saw 100 further includes a level 160, as shown in FIGS. 9 and 10.

As shown, the level 160 is any known instrument designed to indicate whether a surface is horizontal (level) and/or vertical (plumb). In the shown embodiment according to the invention, the level 160 is a spirit level and is positioned and secured to the connector section 110. However, in alternative embodiments, the level 160 could be secured to the body plate 130 or one of the cutting walls 140. The level 160 may be secured to the connector section 110 or other position using any known joining techniques, such as welding, fastening, or any other method that provides a secure, non-movable connection between the pieces, including adhesion. One skilled in the art would understand that other known measuring devices could be used, including laser line levels, stud finders, and digital tape measures to more accurate position the power tool attachment saw 100.

As shown in FIGS. 11-14, in another exemplary embodiment of the invention, the power tool attachment saw 100 includes a material grasping device 170 and an ejection tool passageway 178.

Figure 11:
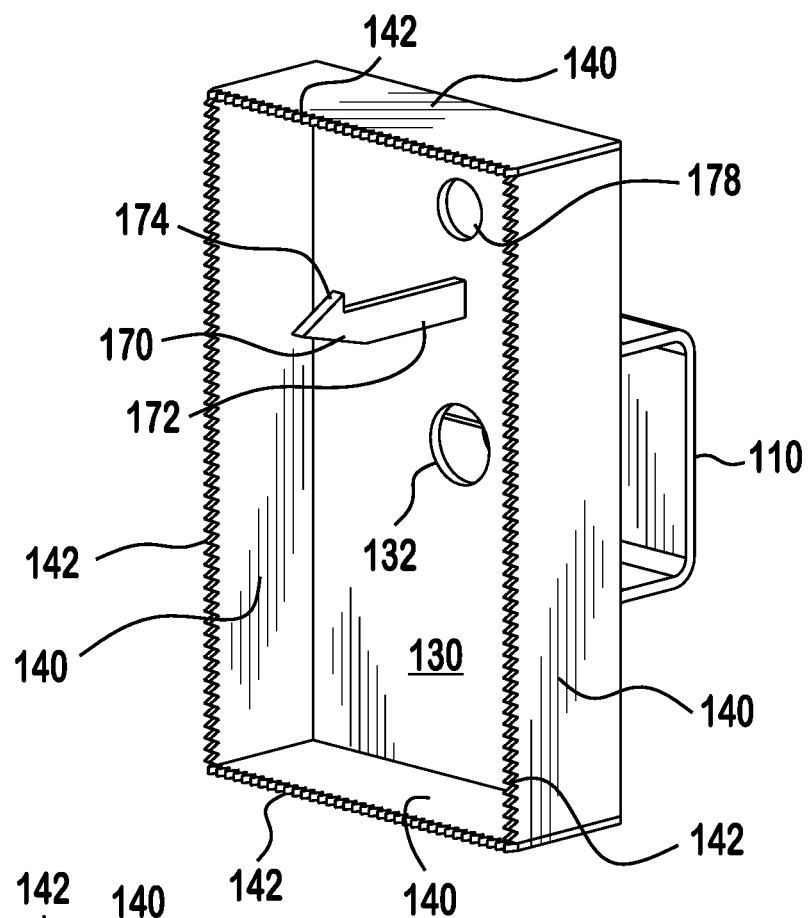
FIG. 11 is a perspective view of another power tool attachment saw with a material grasping device according to the invention.
Figure 12:
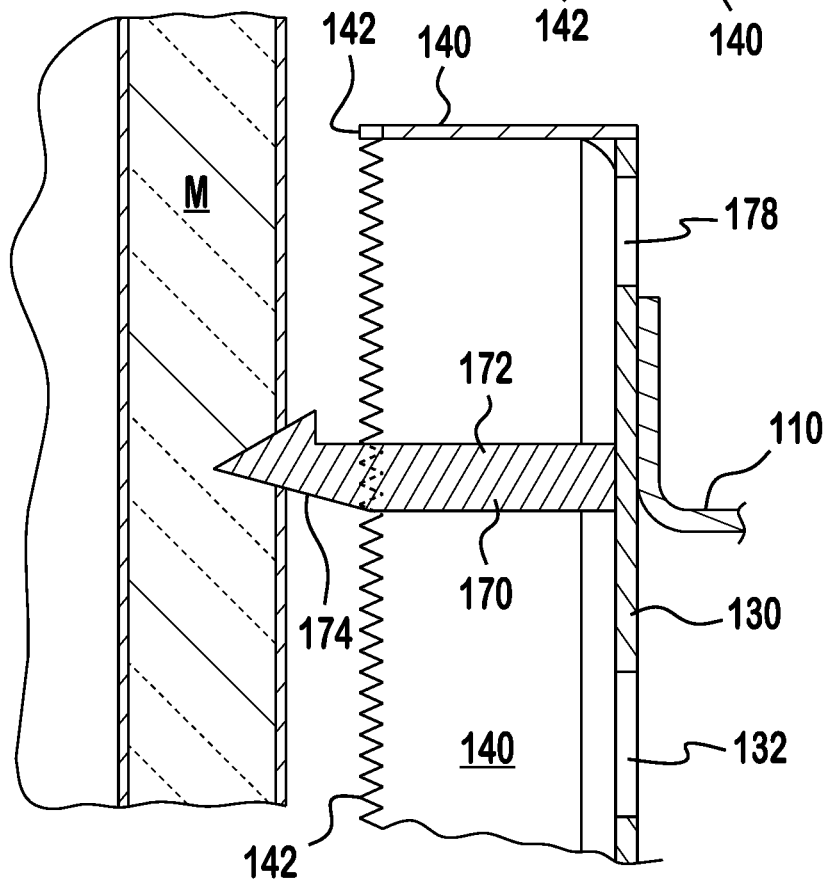
FIG. 12 is a sectional view of the power tool attachment saw of FIG. 9, showing use with a known oscillating power tool.
Figure 13:
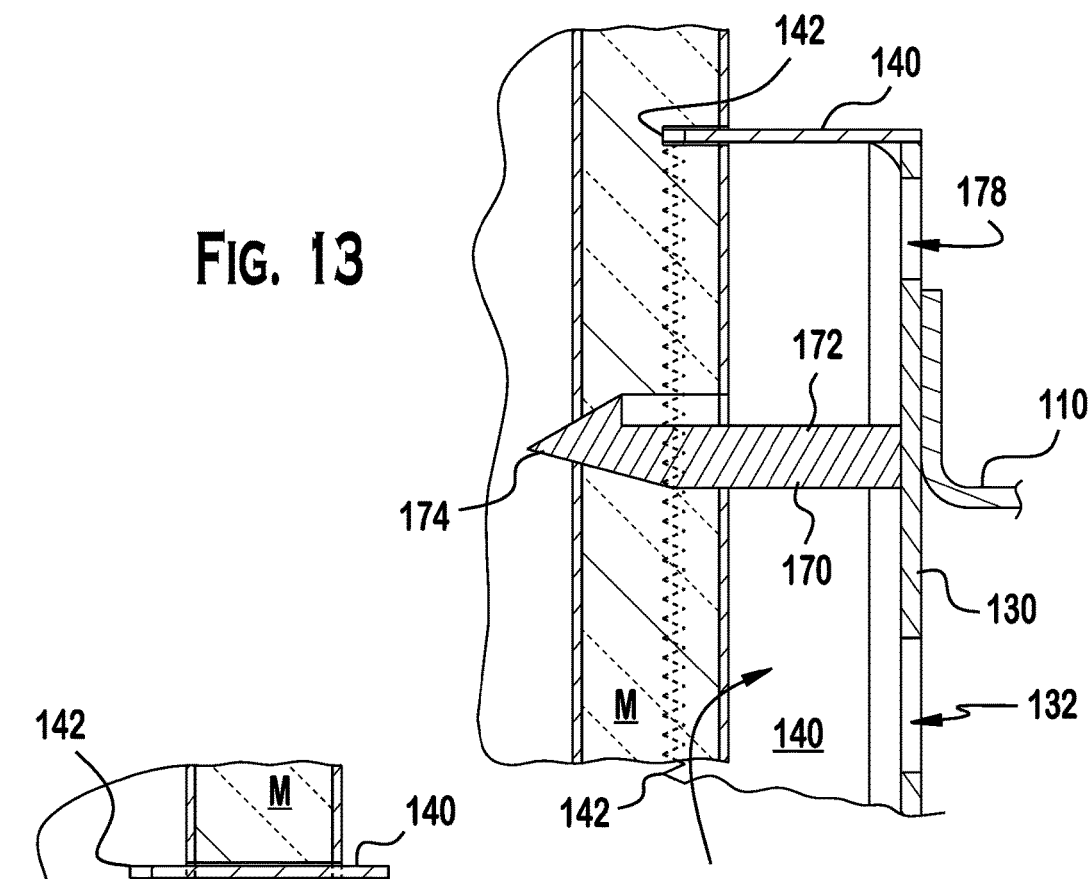
FIG. 13 is a sectional view of the power tool attachment saw of FIG. 9, showing further use with a known oscillating power tool.
Figure 14:
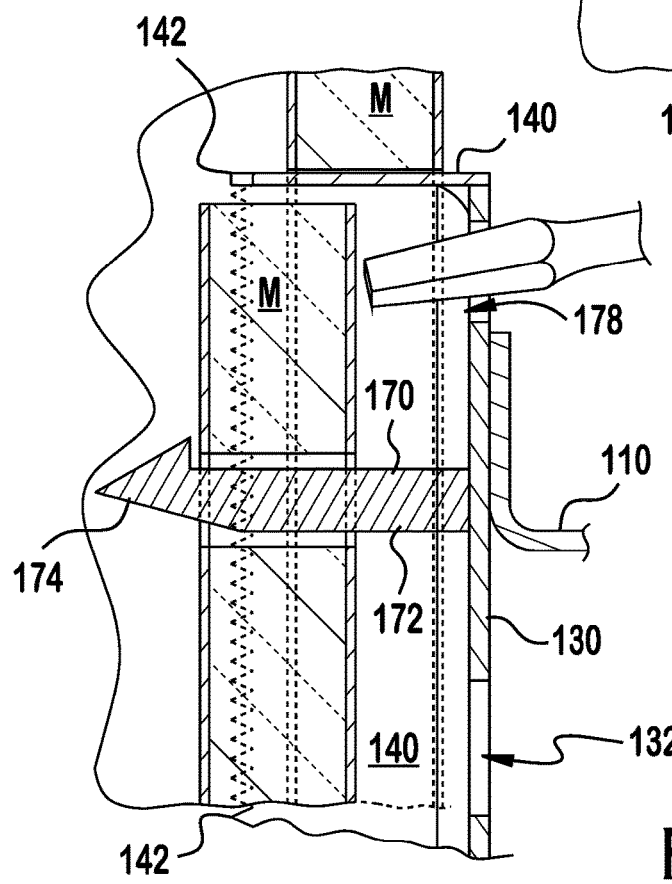
FIG. 14 is a sectional view of the power tool attachment saw of FIG. 9, showing ejection of material held by the material grasping device.

As shown in FIGS. 11 and 12, the material grasping device 170 is an elongated clasp that includes a body 172 and a hook 174 positioned and secured at one end thereof. In the shown embodiment, the body 172 is firmly secured to the body plate 130 with the hook 170 extending away therefrom. The body 172 may be secured to the body plate 130 using any known joining techniques, such as welding, fastening, or any other method that provides a secure, non-movable connection between the pieces, including adhesion. As shown, the hook 174 is a curved or an indented end piece that is capable of piercing and snagging material (i.e. drywall). The material grasping device 170 is positioned within the depth D1 of the material receiving space 150.

As shown in FIGS. 11 and 12, the ejection tool passageway 178 is a through hole extending through the body plate 130 and into the material receiving space 150.

As shown in FIGS. 15-23, in another exemplary embodiment of the invention, the power tool attachment saw 100 further includes a catch 180.

In an exemplary embodiment of the invention, the catch 180 generally includes a material grasping device 182 and an ejection device 190.

As shown, the material grasping device 182 includes a body 184, a stop 186, and a hook 188 positioned at one end thereof. The stop 186 is an external ridge or rim formed between ends of the body 184. In particular, the stop 186 is positioned between the body 184 and the hook 188.

The ejection device 190 includes a push body 192, a spring 198, and a spring stop 199. As shown, the push body 192 is a blunt end knob and includes a body receiving passageway 194 and a spring receiving passageway 196. The body receiving passageway 194 and the spring receiving passageway 196 are both channels that extend through the push body 192 from one end thereof. In the shown embodiment, the body receiving passageway 194 is longer than the spring receiving passageway 196, however, the spring receiving passageway 196 is wider than the body receiving passageway 194. In the shown embodiment, the body receiving passageway 194 and the spring receiving passageway 196 are cylindrical channels and correspond in size and shape to the body 184 and the spring 198 respectively. As shown, the spring 198 is a helical spring designed for compression. However, the spring 198 could be any elastic object used to create compression. The spring stop is annular body that is securely positioned along the body plate 130 or the connector section 110 and corresponds with the spring 198.

In the shown embodiment, the body 184 is positioned through a body receiving passageway 131 that extends through the body plate 130 and secured to the ejection device 188. More particularly, the body 184 is guided through the body receiving passageway 196 and secured to the push body 190. The spring 198 is positioned between and bias against the push body 190 and the body plate 130 and, more particularly, the spring 198 is positioned against an outer surface of the spring stop 199 and the push body 192 within the spring receiving passageway 196. The body 184 and may be secured to the push body 190 using any known joining techniques, such as welding, fastening, or any other method that provides a secure, non-movable connection between the pieces, including adhesion.

As shown, the hook 186 includes a curved or an indented end piece that is capable of piercing and snagging material (i.e. drywall). The material grasping device 170 is positioned within the depth D1 of the material receiving space 150.

As shown in FIGS. 11 and 12, ejection tool passageway 178 is a through hole extending through the body plate 130 and into the material receiving space 150.

Now with reference to the Figures, assembly of the power tool attachment saw 100 to the power tool 200 will be described.

As shown in FIG. 3, the fastener shaft 212 is positioned to the fastener-receiving passageway 114 by guiding the fastener shaft 212 from one side of the connector plate 112 through the fastener-positioning channel 116. The fastener head 214 is then positioned between the connector plate 112 and the body plate 130. The interface 206 is then aligned with the plurality of protrusion receiving spaces 118 such that the plurality of protrusions 208 are received by the protrusion receiving spaces 118.

Figure 6:
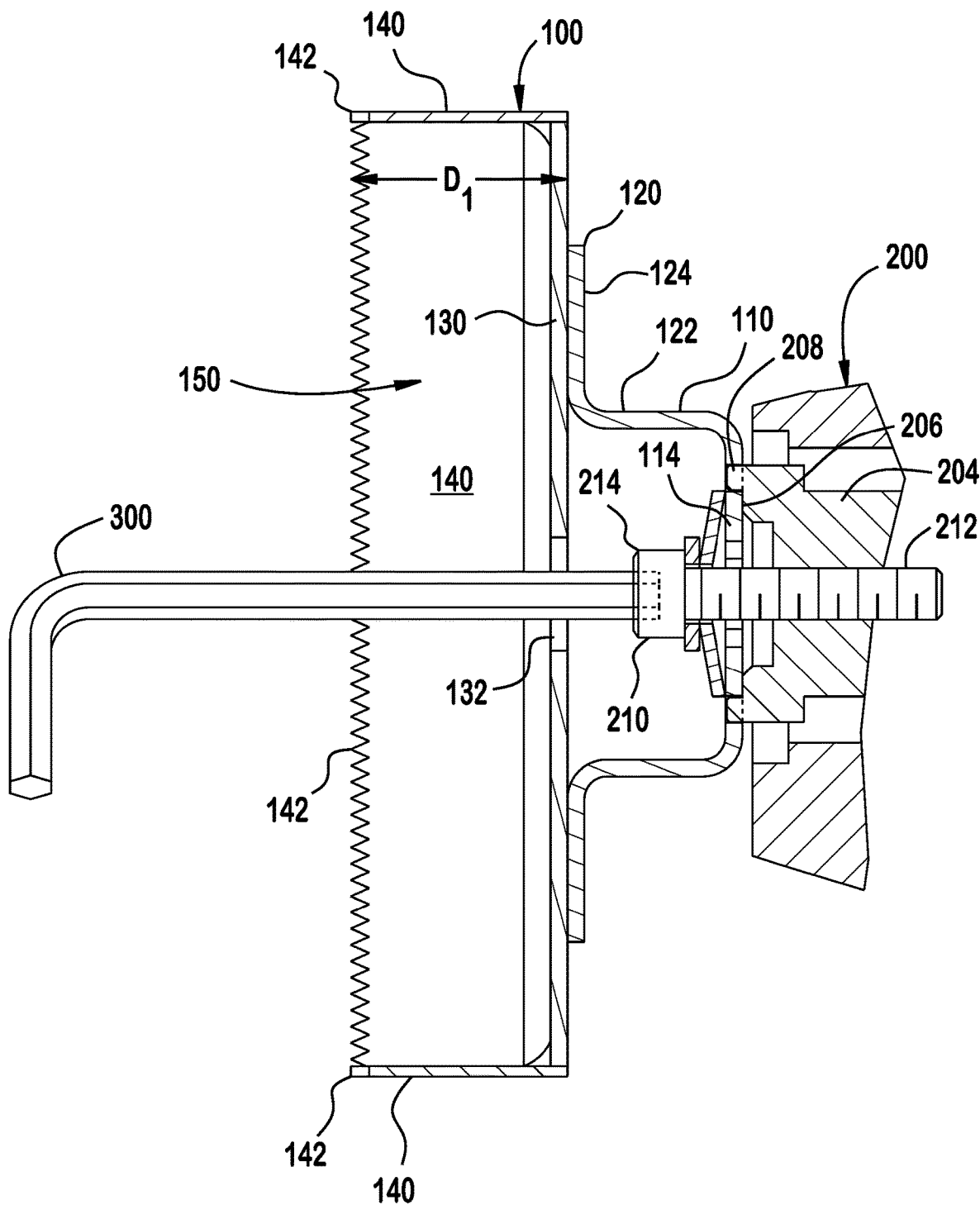
FIG. 6 is a sectional view of a power tool attachment saw according to the invention, showing assembly with a known oscillating power tool.

As shown in FIG. 6, the fastener shaft 212 is then secured to the fastener-receiving passageway 208 by tightening the fastener shaft 212 using a tightening tool 300 that extends through the tool receiving passageway 132.

Figure 7:
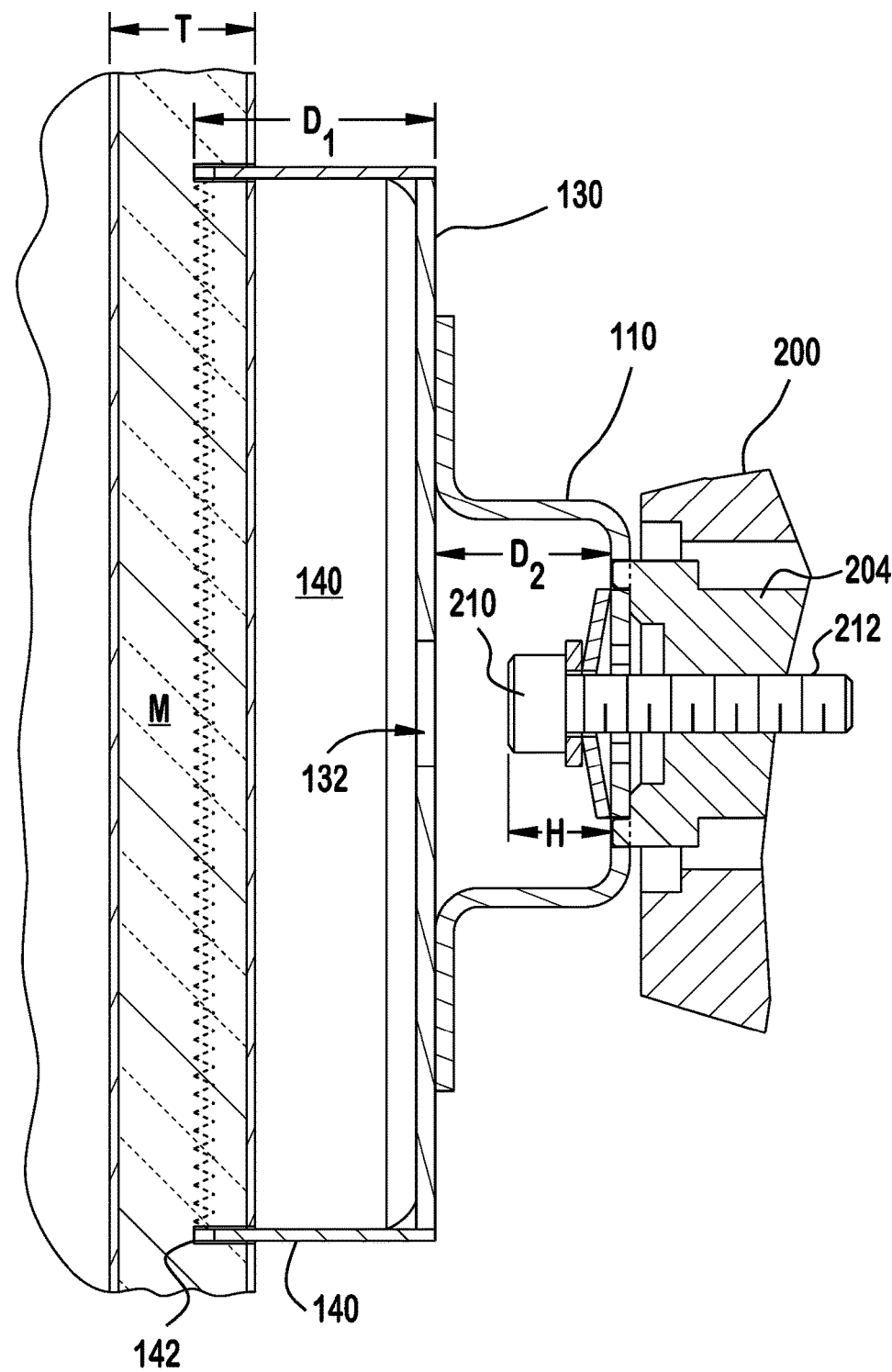
FIG. 7 is a sectional view of a power tool attachment saw according to the invention, showing use with a known oscillating power tool.
Figure 8:
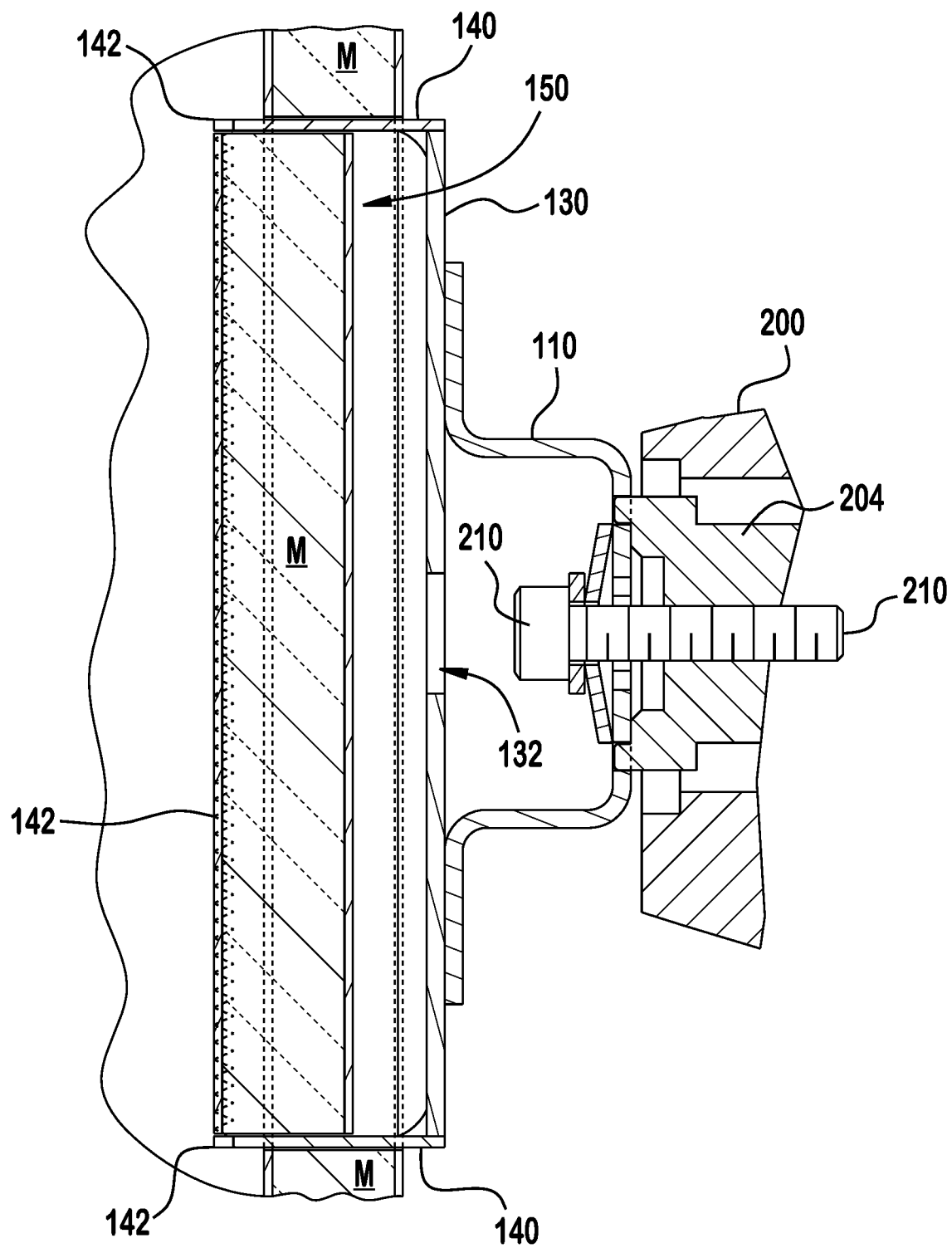
FIG. 8 is a sectional view of the power tool attachment saw of FIG. 7, showing further use with a known oscillating power tool to provide an opening in drywall.

Now with reference to FIGS. 7 and 8, use of the power tool attachment saw 100 with the power tool 200 will be described.

In order to cut an opening, such as a rectangular shaped opening, in a material (i.e. drywall), the use measures and marks corners of the desired opening and then aligns the power tool attachment saw 100 with the first corner and using the power tool attachment saw 100 to cut the opening. Using the level 160, the cutting walls 140 are position to be horizontal (level) and vertical (plumb) (see also FIGS. 9 and 10).

As the power tool 200 oscillates, the power tool attachment saw 100 performs tiny cuts in the material using the cutting edges 142. Since oscillation is controlled by very small angles (i.e. 1° degree-5° degree), the power tool attachment saw 100 easily cuts through the material, which is then received by the material receiving space 150.

As shown in FIGS. 11-14, the material grasping device 170 may be used to grasp the material cut from the opening, wherein the hook 174 pierces the material. As the cutting walls 140 continue to cut, the material slides onto the body 172 to be disposed of. As shown, the material is held in the material receiving space 150 and a user can use a tool (i.e. screwdriver, finger or probe) through the ejection tool passageway 178 to eject the material from the material receiving space 150.

As shown in FIGS. 15-23, the catch 180 may be used to grasp the material cut from the opening, wherein the hook 188 pierces the material. As the cutting walls 140 continue to cut, the material slides onto the body 184 to be disposed of. As shown, the material is held in the material receiving space 150 and a user can use the ejection device 190 to eject the material from the material receiving space 150.

Figure 18:
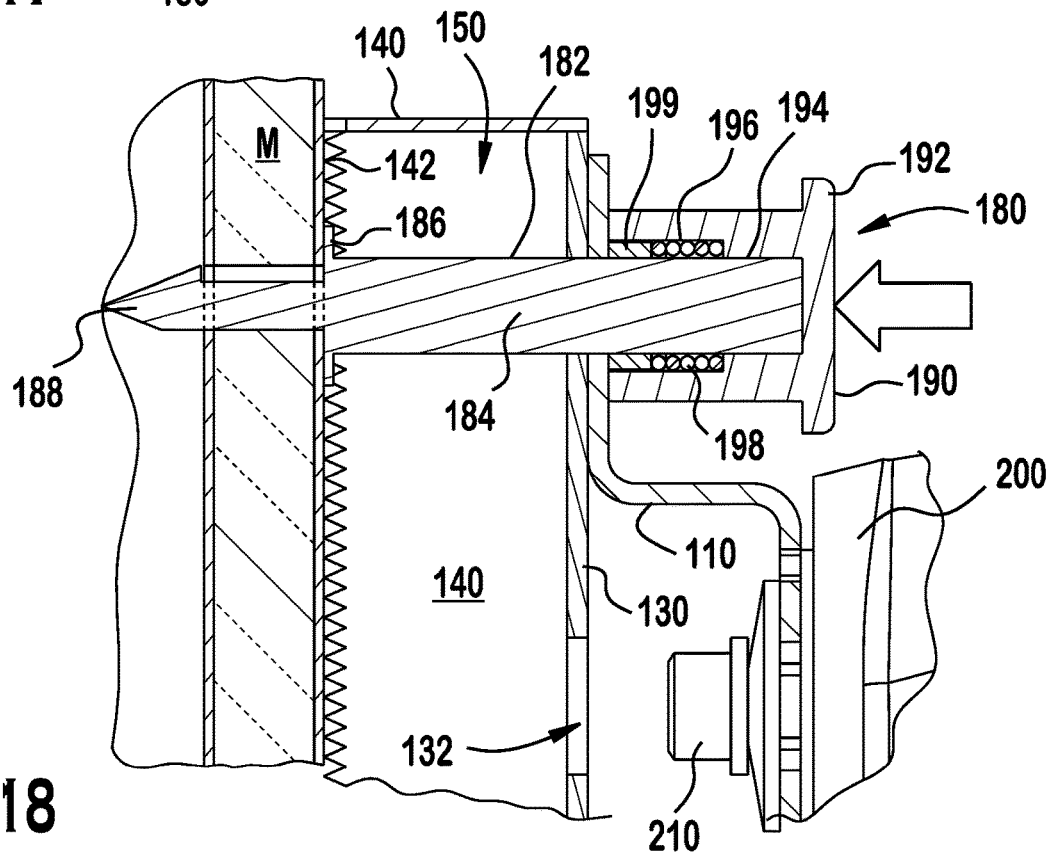
FIG. 18 is a sectional view of the power tool attachment saw of FIG. 9, showing use of the catch.
Figure 19:
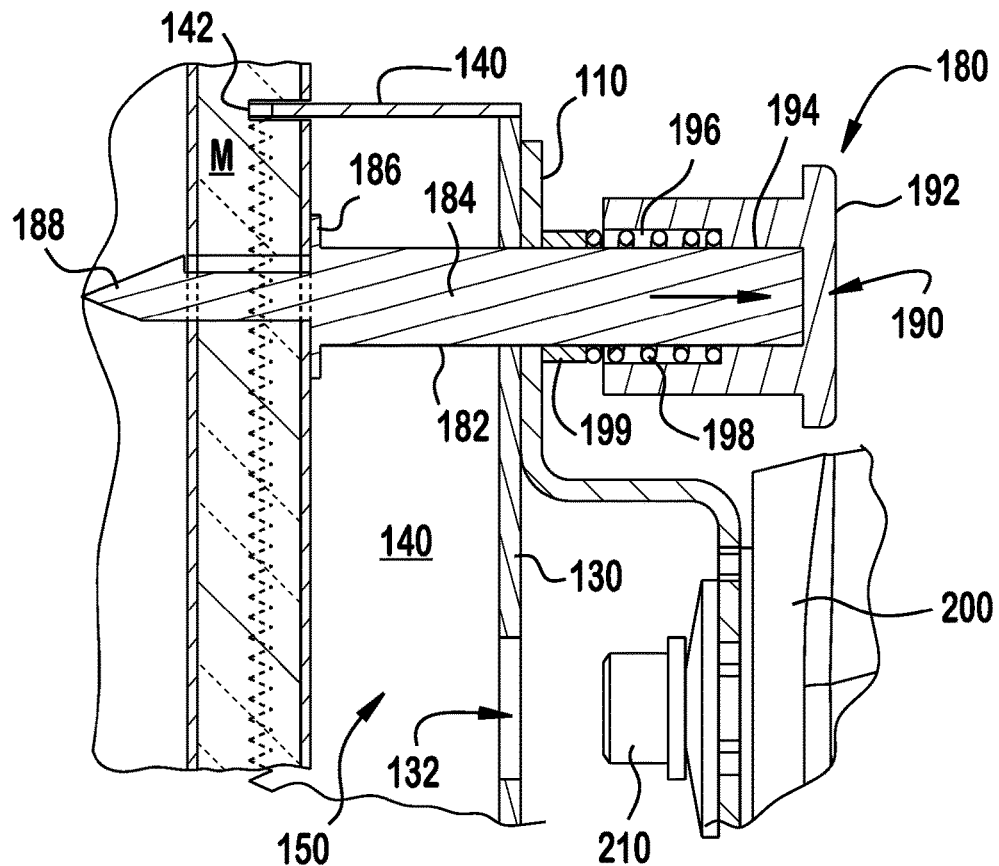
FIG. 19 is a sectional view of the power tool attachment saw of FIG. 9, showing further use with a known oscillating power tool.
Figure 20:
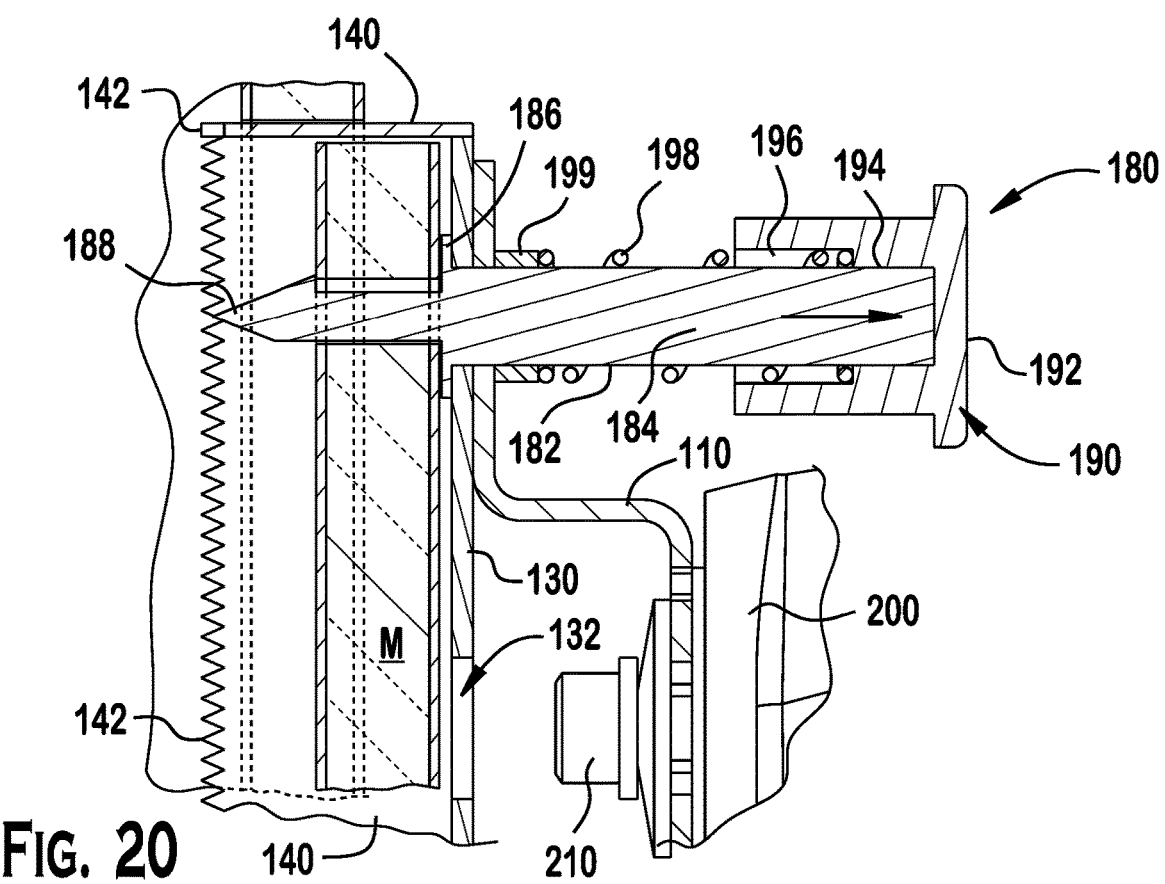
FIG. 20 is a sectional view of the power tool attachment saw of FIG. 9, showing even further use with a known oscillating power tool.

Furthermore, the catch 180 can be used to stabilize the cutting walls 140 before cutting. The ejection device 190 can urge the body 184 and hook 188 beyond the depth D1 of the material receiving space 150 and into the material. The push body 190 is stabilized by the compression of the stop 186 against the body plate 130. However, when urged, the push body 190 moves the body 184 through the material receiving space 150 and beyond the cutting walls 140. The stop 186 prevents over extension of the body 184 by abutting the material. The hook 188 then grasps the material and the spring 198 urges the hook 188 toward the body plate 130 to urge the cutting walls 140 against the material, as shown in FIG. 18. As the cutting walls 140 continue to cut, the material slides onto the body 184 to be disposed of.

To discard, the push body 190 is urged to move the body 184 and the material through the material receiving space 150 and beyond the cutting walls 140. The user can then extract and discard the material.

While various embodiments of the present disclosure have been shown and described, it will be understood that other modifications, substitutions, and alternatives are apparent to one of ordinary skill in the art. Such modifications, substitutions, and alternatives can be made without departing from the spirit and scope of the disclosure.

What is claimed is:

1. A power tool attachment saw comprising:
a body plate having a planar body having an inner surface and an outer surface and a tool receiving passageway extending there through;
a connector section having:
a connector plate positioned above the outer surface of the planar body and adapted for attachment to an oscillating power tool, a fastener-receiving passageway extending there through and corresponding to the tool receiving passageway positioned apart therefrom, and
a fastener-positioning channel extending through the connector plate from one side thereof to the fastener-receiving passageway; and
a plurality of cutting walls positioned orthogonal to and extending from exterior edges of the planar body to form a material receiving space, the plurality of cutting walls providing a uniform cutting edge about the material receiving space; and
a material grasping device secured by a spring biasing mechanism to the planar body and extending orthogonal to the planar body, the material grasping device having a leading tip positioned within the material receiving space.

2. The power tool attachment saw of claim 1, further comprising a plurality of protrusion receiving spaces arranged evenly about the fastener-receiving passageway.

3. The power tool attachment saw of claim 2, wherein the fastener-receiving passageway and the protrusion receiving spaces are sized, shaped, and positioned to complement an attachment fastener and spindle of the oscillating power tool.

4. The power tool attachment saw of claim 1, further comprising a pair of support arms extending from ends of the connector plate and firmly secured to the body plate.

5. The power tool attachment saw of claim 4, wherein the pair of support arms extend from the connector plate at a 90° degree angle.

6. The power tool attachment saw of claim 1, wherein each cutting wall of the plurality of cutting walls include a hard toothed edge.

7. The power tool attachment saw of claim 1, further comprising a level positioned and secured to the connector section.

8. The power tool attachment saw of claim 1, further comprising a level positioned and secured to the body plate.

9. The power tool attachment saw of claim 1, wherein the material grasping device is an elongated clasp having a body connected to the body plate and a hook positioned at an opposite end thereof.

10. The power tool attachment saw of claim 9, wherein the hook is an indented end piece capable of piercing and snagging material.

11. A power tool attachment saw comprising:
a body plate having a planar body having an inner surface and an outer surface and a tool receiving passageway extending there through;
a connector section having:
a connector plate positioned above the outer surface of the planar body and adapted for attachment to an oscillating power tool, a fastener-receiving passageway extending through the connector plate and corresponding to the tool receiving passageway positioned apart therefrom, a pair of support arms extending from opposite ends of the connector plate and joining the connector section to the body plate, and
a fastener-positioning channel extending through the connector plate from one side thereof to the fastener-receiving passageway; and
a plurality of cutting walls positioned orthogonal to and extending from exterior edges of the planar body to form a material receiving space, the plurality of cutting walls providing a uniform cutting edge about the material receiving space; and
a catch moveable through the body plate and extending into the material receiving space, the catch having a material grasping device with a leading tip positioned in the material receiving space;
a leveling device secured to the body plate and positioned to correspond with a horizontal and vertical planes extending through the plurality of cutting walls.

12. The power tool attachment saw of claim 11, wherein the fastener-positioning channel is an elongate void having a consistent width over a length of the fastener-positioning channel.

* * * * *